Dec. 15, 1936.  B. B. FORTNEY  2,064,253
NONGLARE HEADLIGHT CONSTRUCTION
Original Filed July 30, 1932  3 Sheets-Sheet 1
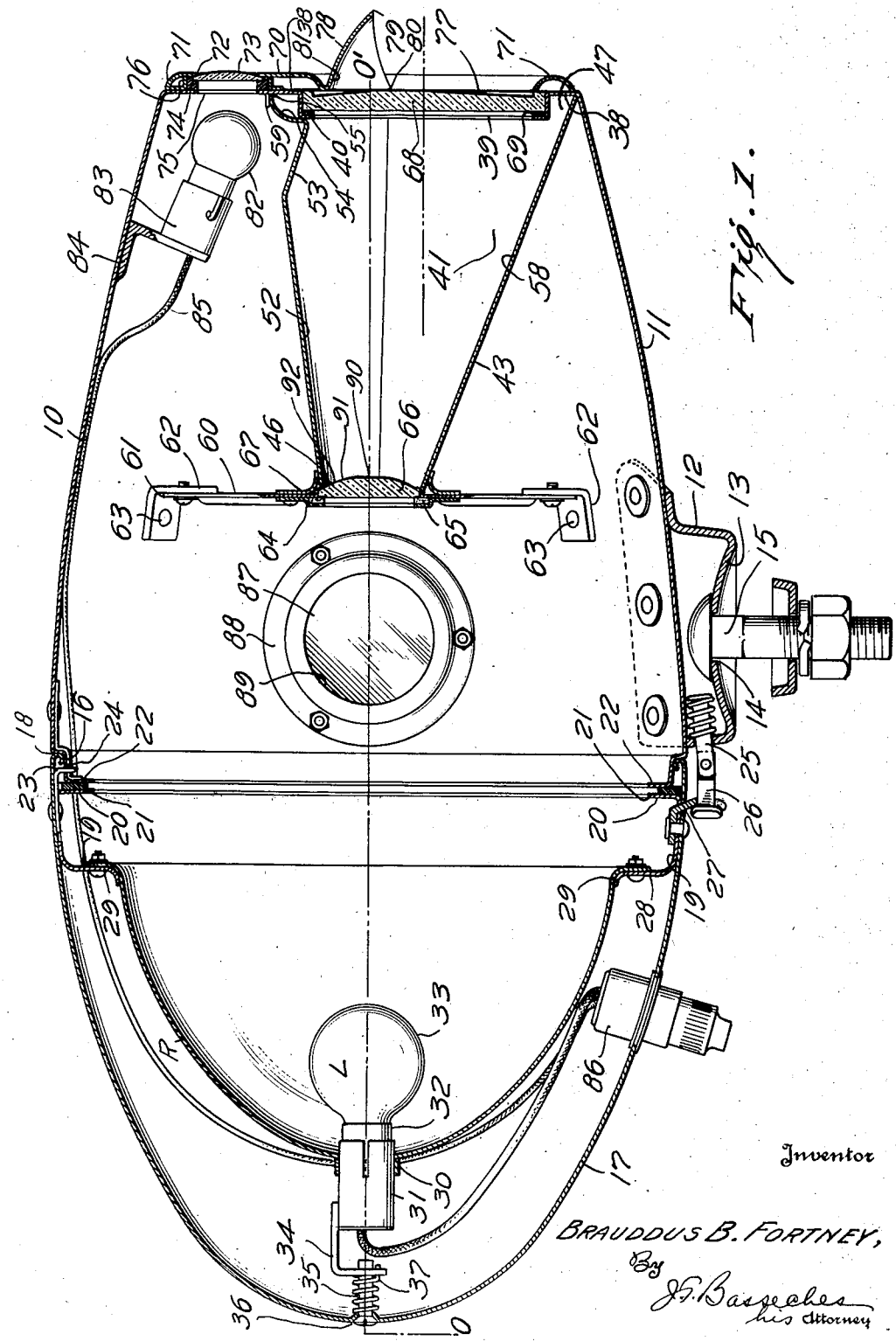
Fig. I.
Inventor
BRADDUS B. FORTNEY,
By
his Attorney

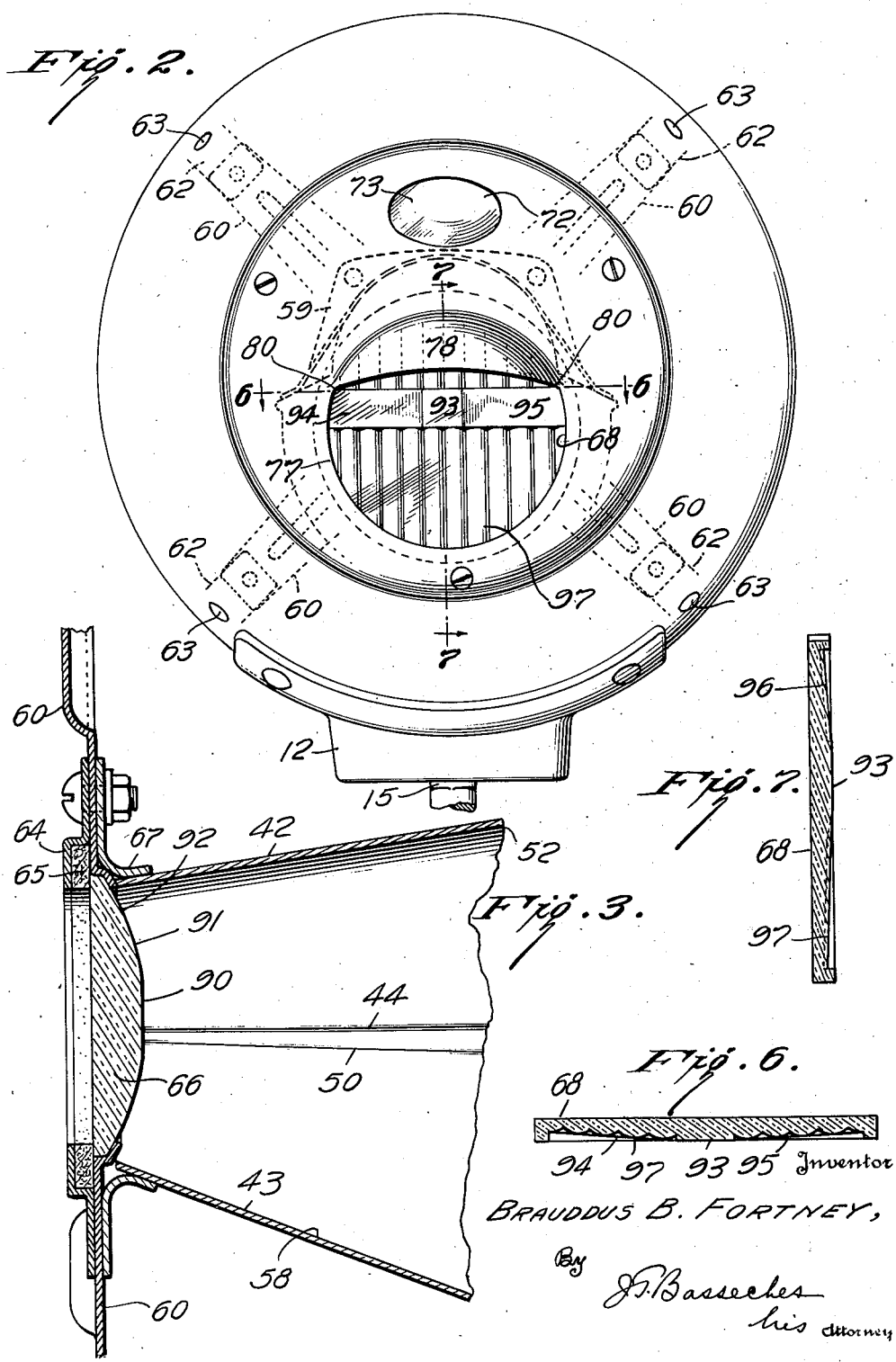

Dec. 15, 1936.  B. B. FORTNEY  2,064,253
NONGLARE HEADLIGHT CONSTRUCTION
Original Filed July 30, 1932    3 Sheets—Sheet 3

Inventor
BRAUDDUS B. FORTNEY,
By J. P. Basseches
his Attorney

Patented Dec. 15, 1936

2,064,253

UNITED STATES PATENT OFFICE 2,064,253

NONGLARE HEADLIGHT CONSTRUCTION

Brauddus Brock Fortney, Louisville, Ky.

Application July 30, 1932, Serial No. 626,784
Renewed October 10, 1935

6 Claims. (Cl. 240—41.3)

This application is an improvement on my prior applications, Serial No. 261,004, filed March 12, 1928; now Patent No. 1,883,359 Serial No. 335,875 filed January 29, 1929; now Patent No. 1,883,360 Serial No. 335,876 filed January 29, 1929; now Patent No. 1,883,361. It is an object of my first mentioned inventions to provide a non-glare headlight and illuminating unit for vehicles, in general, and more particularly for automobiles, locomotives, and marine, aviation and other illuminating purposes, and to provide illuminating units for air ports, and field illumination for stadiums and similar open air fields, which may be desired to be illuminated for night activities.

The present invention is directed to an extension of the inventions covered by my prior applications aforementioned, and is directed to novel improvements in constructional details residing in the assembly with the systems generally referred to in my prior applications, wherein light distribution, featured in said prior applications, may be materially augmented and the illumination efficiency materially increased, in accordance with the purposes and uses to which the general assembly as referred to in my prior applications are applied for purposes of distribution of the light projected to give a desired spread over the area of the foreground, intermediate distances and furthermost sections of the roadbed, with uniformity and the necessary amount of illumination.

Thus it is contemplated as an object of my present invention to provide an illuminating system which permits an increase in the source of light over the usual prescribed candlepower for headlights, without objectionable glare, and increases the seeing efficiency of both the field that is illuminated and the field to the rear of the illuminating source. It is further contemplated as an object of my invention to provide a headlight and illumination system, particularly for motor vehicles in which no limitation need be placed upon the illuminating source, characterized by providing a projecting system in which reflectors that are used are obscured from direct vision, and particularly the reflective areas, do not present an objectionable illuminated field, irritating to the eyes when viewed and in which the projection system is further characterized by the ability to project a beam which is definitely controlled.

It is a further object of my invention to provide a headlighting and illuminating unit peculiarly suitable for utilizing high candlepower light sources, to increase the illuminating efficiency and safety factors in night driving, with proper and uniform distribution of the light over the area to be illuminated, so that safe visibility is provided for opposing drivers, where the headlight is used for motor vehicles, or for the illumination of landing fields, to provide safe illumination to pilots in making landings in night flying.

Other objects of my invention reside in the provision of headlighting and illuminating units of simple and inexpensive manufacture, attaining high efficiency in illuminating and safety, characterized by freedom from glare under a wide range of intensities and light sources that may be used.

To attain these objects and such further objects as may appear herein or be hereinafter pointed out, I make reference to the accompanying drawings, forming a part hereof, in which—

Figure 1 is a longitudinal sectional view of my device;

Figure 2 is a front elevation thereof;

Figure 3 is an enlarged fragmentary sectional view of the auxiliary reflector and focal area lens mounting;

Figure 6 is a horizontal section of a frontal lens taken on the line 6—6 of Figure 2;

Figure 7 is a vertical section taken on the line 7—7 of Figure 2.

Figure 4:
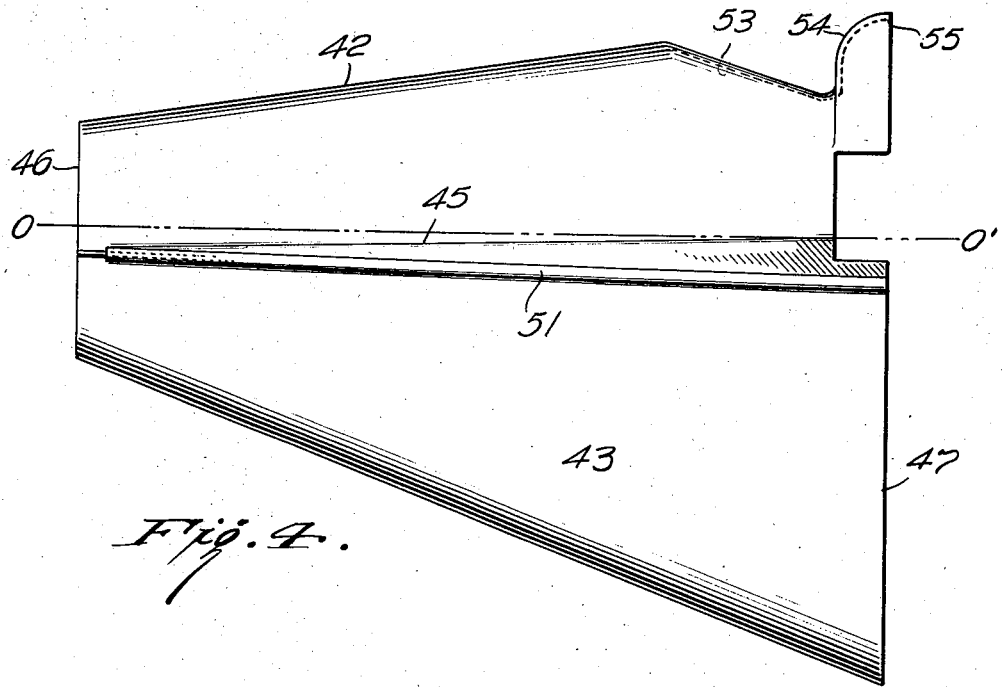
Figure 4 is an enlarged detail in side elevation of the auxiliary reflector.

Making reference to the drawings, in a preferred embodiment of my invention, the headlight as contemplated by me, especially of value in connection with the production of a headlight for motor vehicles, comprises a shell or housing 10, of general ovoid contour, including a front section 11, which is provided with a bracket 12, affixed thereto, and including an arcuate branch 13, orificed at 14, and through which orifice there may be passed a bolt 15, for purposes of attaching the entire assembly rigidly to a complemental bracket of the motor vehicle, in accordance with standard practice. The rearward portion of the section 11 is formed with a flange 16, to which may be attached the rear section 17 forming one of the complemental sections of the housing. The rearward section is formed with a peripheral beaded flange 18, snugly engaging the flange 16 of the forward section 11, previously described.

Interiorly of the rear section 17, there is affixed a U-shaped rim 19, one branch of which 20, serves as a bearing for a gasket 21, cooperating with the inwardly turned rib 22, formed from the flange 18 previously described, to hold the sections 11 and 17 in sealed and resilient engagement.

Preferably at the upper portion of the section 17, there is affixed the hooked member or latch 23, engaging an orifice 24, formed in the upper portion of the flange 16.

At the lower portion of the housing and affixed within the bracket 12, there is provided a resiliently mounted bolt 25, having a hinged T-shaped head 26, engaging a bifurcated strap 27, affixed to the lower portion of the rear section 17. By this construction, the front section 11 and the rear section 17 are held in assembled relation and the rear section 17 may be readily separated from the forward section 11 of the housing, for purposes of replacement or adjustment, as will be readily understood. Disposed from the branch 28 of the U-shaped flange 19, there is positioned a reflector R, by uniting the peripheral outwardly turned edge 29 thereof to the branch 28, previously described, by bolting, riveting or other suitable means. The reflector R is preferably a section of an ellipsoid, in accordance with my prior applications S. N. 335,875 and S. N. 335,876, although it will be understood that in accordance with the present embodiment, this reflector may be part of a light ray converging system, coming within the spirit of my prior applications, aforementioned or a light ray condensing reflector made from a section of a distorted ellipsoid, paraboloid, spheroid or the like.

Cooperating with the reflector R, there is provided suitable means for mounting a light source L, and in this embodiment the reflector R is orificed at 30, through which orifice there may be disposed a socket 31 for holding the stem 32 of an incandescent bulb 33. The socket 31 is affixed to a bracket 34, connected with an adjusting screw 35, accessible from the exterior of the housing at the counter-sunk orifice 36. A coiled spring 37, mounted upon the adjusting screw 35, serves to maintain the bracket 34 and adjusting screw 35 in predetermined relationship, as will be readily understood.

The forward end of the frontal section 11 is preferably spun or stamped with an inwardly directed flange 38, having an opening 39, of circular contour. This opening is defined by the rim 40, and is disposed eccentrically to the general axis of the entire shell, as will be more readily understood as this description proceeds.

Figure 5:
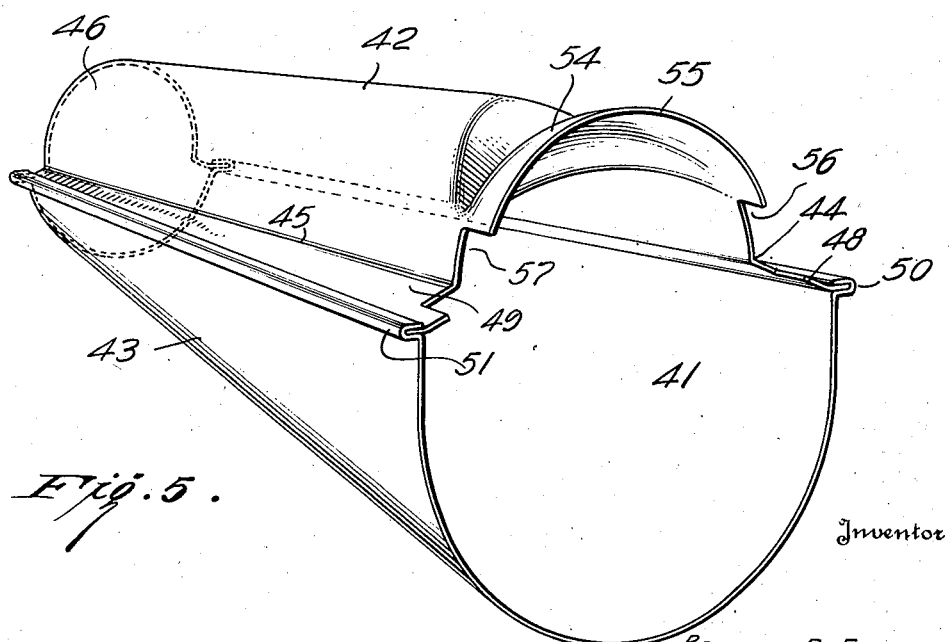
Figure 5 is a perspective view of the auxiliary reflector.

For use in connection with the assembly thus described, I provide an auxiliary reflector 41, of general frusto-conical contour, more specifically illustrated in detail in Figures 3, 4 and 5. This auxiliary frusto-conical reflector may be of the general type referred to in my prior applications. However, it is preferred, in the present embodiment, for purposes which will appear herein as this description proceeds, to make this auxiliary reflector of two dissimilar sections comprising an upper section 42 and a lower section 43, and combine the same into two parts cooperating to make the frusto-conical section of a cone having an oblique axis, the axis of which is inclined downwardly with respect to the optical axis of the projection system. The upper and lower sections, constituting the members 42 and 43, respectively, are portions of frusto-conical sections whose directrices are of unequal radii, so that the directrix of the upper section 42 is of a smaller radius than the directrix of the lower section 43.

To form the section 42, a sheeted material, such as metal or glass is pressed into a parti-frusto-conical configuration defined by the edges 44 and 45, which edges run from the smaller opening 46 to the larger opening 47, angularly to include at the smaller opening 46 slightly more than one half of the circular section at this point. The edges 44 and 45 slant upwardly, to merge into the axial line adjacent the larger opening 47. Beyond the edges 44 and 45, the metal, where this is used, is pressed upwardly into flanges 48 and 49. These cooperate with the beaded edges 50 and 51, formed as part of the lower section 43, to provide the frusto-conical auxiliary reflector 41. The interior surface 52 of the upper section 42, together with the interior surface formed by the flanges 48 and 49, are provided with mirrored reflective surfaces.

At the forward edge of the upper section, this member is indented with a downwardly directed surface portion 53, of a slope which will appear more clearly as this description proceeds. The extreme edge of this surface is then outwardly directed and arcuately curved at 54, terminating into the edge 55. A portion of the upwardly curved surface 54 forms a rim, for purposes which will appear hereinafter, and that portion of the rim which terminates adjacent the flanges 48 and 49 is slotted at 56 and 57 to provide clearance portions.

The lower section 43 is formed into an uninterrupted parti-frusto-conical section running from the smaller opening 46 to the larger opening 47, and the interior surface 58 is preferably provided with a matted non-reflecting surface.

The frusto-conical member of the character described is disposed into the forward section 11 of the headlight so that the lower edge of the opening 47 engages the flange 38 at its lower corner. At the upper edge, engaging the rim 54 adjacent the edge 55, there is disposed a collar or holder 59. The rim 54 engages the inner edge of the rim 40, so that the surface portion 53 is in line and continuous with the opening 39 defined by the rim 40, for a major portion of the opening above the optical axis.

To support the smaller end 46 of the frusto-conical member, I provide a spider 60, the outer branches 61, four of which are supplied, are attached to bracket members 62, which in turn are affixed to the shell of the forward section 11 at 63. The central portion of the spider is provided with a collar 64, having a gasket 65, between which gasket and the opening 46 of the frusto-conical member there is mounted a lens 66. A frame or holder 67, affixed to the outer portion of the spider, serves to rigidly engage and centrally mount the smaller end 46 of the frusto-conical member 41.

Adjacent the forward portion of the frusto-conical member, and within the rim 40, there is disposed a lens 68, interposing preferably between the edge of the rim a gasket 69. With a lens thus positioned within the rim 40, there is then affixed a front plate 70. This front plate is dished at the edges 71 to engage the inwardly directed flange 38, at the same time spacing the front plate for a distance from the surface formed by the flange 38. The upper portion of the plate is provided with an elliptically shaped orifice 72, holding a signal lens 73 against a gasket 74, surrounding an opening 75 formed in the flange 38, previously referred to. A rim 76 serves to hold the gasket 74 and lens assembly, against displacement, in the position aforesaid.

The lower portion of the plate 70 is dished inwardly and is provided with an opening 77 corresponding substantially to the outline of the lens 68 and overlapping the same for a sufficient distance to hold the lens 68 in position. Surrounding the upper edge of the opening 77, the plate is formed with an outwardly disposed visor 78, the forward edge of which 79 preferably terminates adjacent the optical axis of the system to be disposed just in line with the same. The visor is curved to either side of the vertical plane, to preferably terminate slightly below the optical axis at 80. The visor 78 has its interior surface 81 formed with a mirrored reflective surface, and is positioned to align with the surface 53, previously referred to. The visor 78 is preferably formed with a curved surface which is part of a paraboloid or it may be any other surface which will serve the purpose hereinafter referred to. The entire plate 70 as thus provided, is affixed to the front flange 38 by suitable fastening means, such as screws.

Disposed interiorly of the front section adjacent the lens assembly 73, I may dispose a pilot or parking lamp 82, positioned within the socket 83 and held in the predetermined position by the bracket 84, by spot welding or other suitable means. The electrical conductor or wire 85 is connected with the socket 86, serving also to supply the electrical current for the socket 31, previously described.

To a lateral side of the forward section 11, or both sides, if so desired, there is provided an orifice 87. Interiorly of this orifice there is positioned a collar 88, serving to hold a signal lens 89. Where the headlights are used for vehicles in which the standard color signals are employed, the left lamp is provided with a signal lens assembly as just mentioned, to the left side of the shell, and the right headlight is provided, at the right side, with a lens assembly. These signal lenses may be red and green, respectively.

It will thus be observed, from the construction provided, that the headlight construction operates in all general respects in accordance with the projection systems described in my aforementioned applications, which generally may be referred to as converging the rays from the filament of the lamp L adjacent a focal area to the rear of the lens 66. From this point, a divergent beam is projected of substantially the same divergence as the slope of the auxiliary reflector 41 and the lower section 43 thereof. That portion of the beam projected through the lens 66, above the optical axis, will impinge upon the reflective surface 52 and be re-directed within the area below the optical axis, to reinforce the beam at this portion. That portion of the beam above the optical axis, impinging the reflective surface 52 towards the forward side thereof, and upon the reflective area 53, will be downwardly deflected at a greater angle, some of the direct rays above the optical axis impinging upon the visor 78, striking the mirrored surface 81 and spreading light in the immediate foreground in front of the vehicle.

It is preferred by me to provide adjacent the apertures 46 and 47, respectively, a lens system in accordance with an application Serial No. 626,785 filed by me on even date herewith. The lens 66 is preferably a plano-convexo lens, the section 90 whereof is plano-plano adjacent the optical axis. The section 91, surrounding the central section 90, is convexly ground and polished to a different curvature from the concentric section 92, more adjacent the periphery of the lens. By this form of lens, the beam striking the lens 66 will be unmodified adjacent the optical axis, as all parallel rays and those diverging at a slight angle immediately surrounding the optical axis will be projected through the central portion 90, without modification. The diverging beam striking the sections 91 and 92, respectively, will have its divergence modified to different degrees. The frontal lens 68 is of the character more clearly illustrated in Figures 2, 6 and 7. This lens is generally eccentrically disposed to the optical axis, conforming to the opening 47, and has a section 93 of plane cross-section. Those rays adjacent the optical axis pass through this plane section 93 without modification. The sections 94 and 95, to the left and right, respectively of the section 93, are ground to provide prisms for converging the light emanating in the horizontal section defined by these prisms.

Immediately above and below the plano-plano section 93 and the prismatically formed sections 94 and 95, the lens is formed with fluted portions 96 and 97. The mean line passing through the flutings 96 and 97 is angularly disposed from the central section 93. In the vertical plane the flutings 96 and 97 slope backwardly for a small angle.

The general assembly of the auxiliary reflector 41, the lens 66 and 68 and the visor 78 cooperate to modify the converged beam emitting from the lamp L and the reflector R, to uniformly distribute the light beam for illuminating the road surface and the area in front of the headlight, in a manner best suited to road conditions. The most intense rays adjacent the optical axis will be projected without substantial modification, to illuminate extremely distant points. The flutings formed in the lens 68 will cooperate with the upper section of the auxiliary reflector 52, 53 and the reflective area 81 of the visor, to illuminate the foreground of the roadway in front of the headlight, where it is used for vehicles, such as automobiles.

The flutings of the lens 66, below the plano-plano section 93 and the prismatically formed areas 94 and 95, will be projected upon the roadway to flood-light the same and spreading the light for an extremely wide area, thus providing a visible area by which objects will be made visible not only by directly impinged light but by light diffused from the roadbed itself, accentuating contrast of objects positioned within the area illuminated from this section of the lens. It will further be observed that with the lens 68 positioned eccentrically in respect to the optical axis and the rays impinged thereon and projected through the lens 68 being of a divergent beam, no converging point of light will be presented in front of the headlight, thus eliminating any glare or scintillating effect to the direct observer of this light.

It will further be observed that with the auxiliary reflector formed of two dissimilar sections, particularly with the frusto-conical section 42 formed of a directrix whose radius is less than that of the directrix of the frusto-conical section 43, these sections cooperating with the flanges 48 and 49, will prevent any tendency to form internal reflection of the rays and the beam which is observed from the fringes will not present intensely illuminated reflector areas from the light source, and the reflector R, cooperating with it.

It will further be observed that the mounting that I have provided for the auxiliary reflector in the nature of the spider, permits the directly projected rays not controlled by the reflector R or the cooperating lens 66 to be flooded within the interior of the shell or forward section 11 and be diffused, and will be projected from the lens assembly 73. Thus under ordinary driving conditions, with the lamp L illuminated, the periphery 47 will be barely discernible and to signal the approach of this headlight, the uncontrolled rays emitted from the lamp L will be projected and be visible through the lens assembly 73. The character of lens which I provide at the assembly 73 is not for illuminating purposes, but primarily for signalling, and this may be amber or differently colored lenses, such as red and green.

Where the main projection system is not in use, and where the headlight is to be used for motor vehicle purposes, the lamp 82 may be switched on. The lamp 82 may be of low candlepower, low consumption character, to serve merely for parking purposes, to render the vehicle to which these headlights are attached, discernible.

It will be observed, further, that where I provide in the construction described, the focal lens 66 and the frontal lens 68 with plano-plano sections 90 and 93, respectively, adjacent the area surrounding the optical axis, the lowermost edge 79 of the visor 78 may be disposed slightly above the optical axis for an extremely small angle, such as 1°, though it is preferred by me to have the edge 79 substantially in line with the optical axis so that the headlight may be mounted with its optical axis substantially parallel to the roadway where used for an automobile headlight to get illumination for maximum distances in front of the headlight, with absolute cut-off or control at the top of the beam. Where the projector is used for illuminating a landing field for aviation purposes, the size of the visor may be diminished or eliminated, and the lens 68 replaced with a lens without light spreading characteristics.

When the projector is used for this latter purpose, landing may be made in the face of the illumination from the projector, as objects will be discernible from the illumination obtained from the aeroplane headlights to the rear of the projectors on the landing field, without blinding effects upon the pilot from the field projectors.

In general, the projector that I have provided permits the use of exceedingly high candle light sources for general illumination purposes for headlights of land vehicles, marine, or aviation, with definite control and freedom from glare, with maximum seeing efficiency for safety.

Having thus described my invention, and illustrated its use, what I claim as new and desire to secure by Letters Patent, is

1. In a headlight having a light converging system arranged to converge the light from a source to a focal area within the headlight, of a secondary reflector conduit comprising portions of dissimilarly formed frusto-conical sections having its small end substantially concentric with the optical axis of said system adjacent the optical axis, said frusto-conical section above the optical axis having a reflective surface at its upper interior portion, and an arcuately formed deflective section included in the conical member above the optical axis extending towards the same downwardly, a light spreading lens positioned at the forward end of said arcuately formed deflective surface of said conduit and a light spreading reflective visor adjacent said lens for deflecting the rays downwardly.

2. In a headlight, the combination with a projection system converging the light from a source to a focal area within the headlight, of an outwardly divergent frusto-conically formed reflector conduit having its small end concentric with the optical axis of said system adjacent the focal area of said light, said frusto-conically formed reflector conduit having its upper forward portion downwardly and forwardly inclined toward the optical axis, a light spreading reflective visor disposed at the forward end of said conduit, and a light spreading lens disposed between said conduit and visor, a section of said lens having spreading flutes above the optical axis of said system.

3. In a headlight, the combination with a projection system converging the light from a source to a focal area within the headlight, of a conically formed reflector conduit having an oblique axis having its small end concentric to the optical axis of said system adjacent the focal area of said light, its forward end eccentrically disposed with the optical axis, a portion of which extends below the optical axis, a spider for supporting the small end of said conduit, a signal aperture disposed within said headlight above said conduit whereby diffused light from said system may be projected through said aperture.

4. In a headlight, the combination with a projection system converging the light from a source to a focal area within the headlight, a conically formed reflector conduit having an interior reflective surface and having its small end concentric with the optical axis of said system adjacent the focal area of said light, and its forward end eccentrically disposed with the optical axis to extend a portion of the reflective surface of said conduit oblique to the optical axis, a spider supporting the small end of said conduit leaving the area within said headlight free and unobstructed, a light emitting aperture above said conduit and a signal lens disposed in said aperture.

5. In a headlight, the combination with a projection system converging the light from a source to a focal area within the headlight, of a secondary reflector comprising a portion of an outwardly divergent frusto-conically formed conduit having its small end concentric with the optical axis of said system adjacent the focal area of said light, said frusto-conically formed reflector portion having its upper forward portion downwardly and forwardly inclined toward the optical axis, a light spreading reflective element disposed at the forward end of said conduit, and a light spreading lens disposed between said conduit and element, a section of said lens having light spreading sections above the optical axis of said system.

6. In a headlight, the combination with a projection system converging the light from a source to a focal area within the headlight, of a secondary reflector comprising a portion of an outwardly divergent frusto-conically formed conduit having its small end concentric with the optical axis of said system adjacent the focal area of said light, said frusto-conically formed reflector portion having its upper forward portion downwardly and forwardly inclined toward the optical axis, a light spreading reflective element disposed at the forward end of said conduit, and a light spreading lens disposed between said conduit and element.

BRAUDDUS BROCK FORTNEY.